Patented Nov. 7, 1944

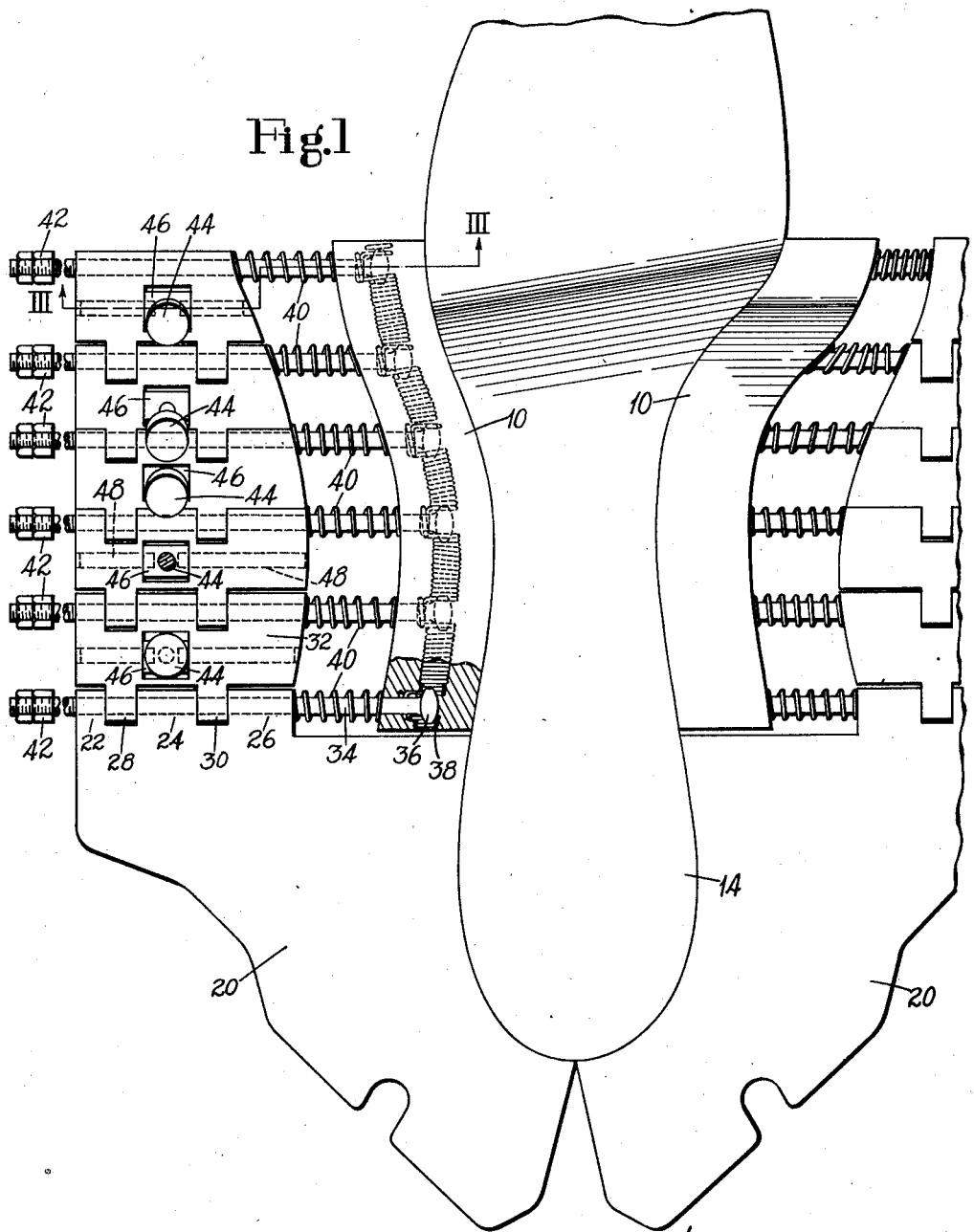

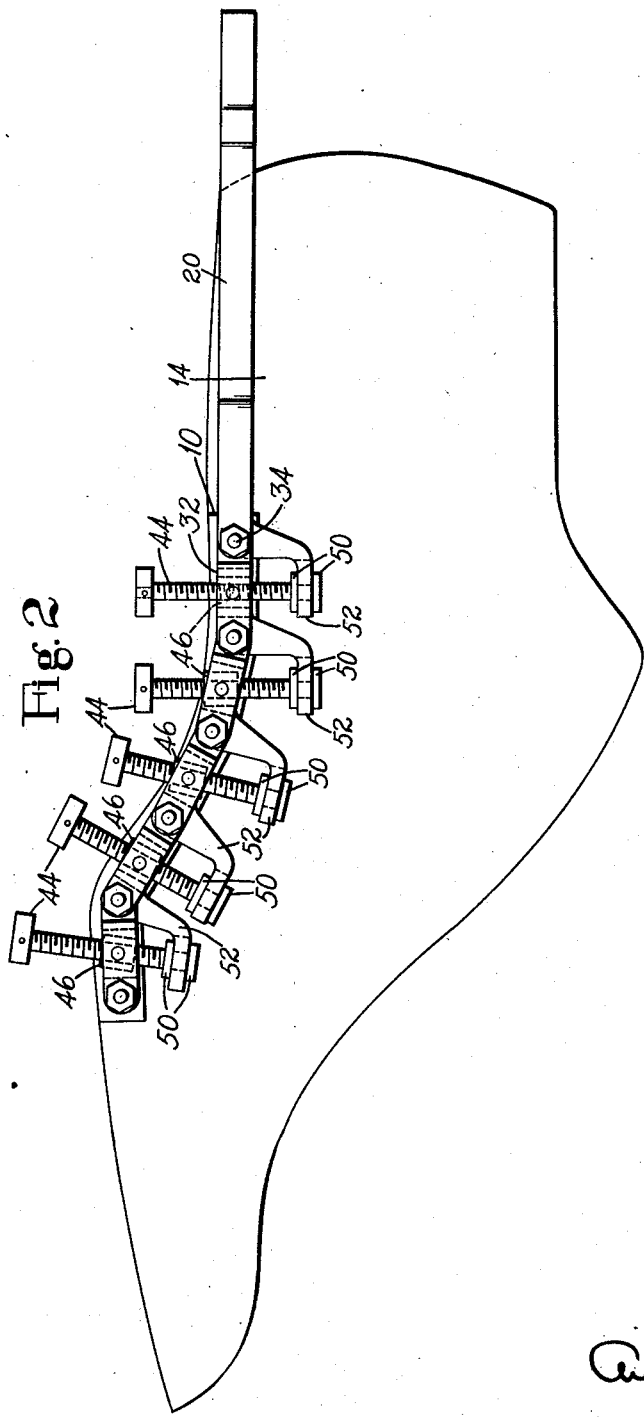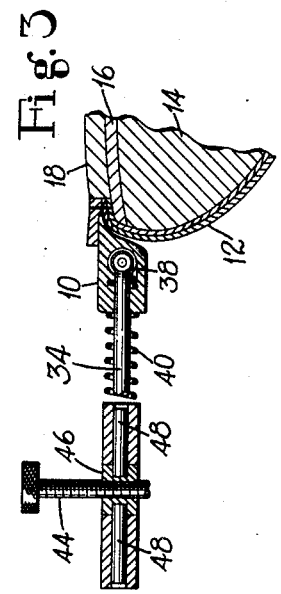

2,362,059

UNITED STATES PATENT OFFICE 2,362,059

LASTING MECHANISM

Andrew Eppler, Jr., Lynn, Mass., assignor to United Shoe Machinery Corporation, Flemington, N. J., a corporation of New Jersey Application March 30, 1943, Serial No. 481,115

27 Claims. (Cl. 12—12)

This invention relates to lasting wiper mechanisms and is herein illustrated in its application to wiper assemblies particularly adapted to operate upon prewelt shoes. It is to be understood, however, that the invention is not limited in its scope to wiper mechanisms for operating on prewelt shoes but is applicable to wiper mechanisms for use in the manufacture of other types of shoes.

In lasting machines generally, and particularly in machines for lasting prewelt shoes, it is considered necessary to have on hand and conveniently located for use in the machine, a considerable number of wipers for use on different sizes and styles of shoes and separate sets must be provided for right and left shoes. The maintenance and repair of the full complement of wipers required for a given machine is an item of considerable expense to manufacturers and the time required to change wipers whenever a different size or type of shoe comes to the machine appreciably reduces the productive capacity of the machine, particularly in the smaller factories where only one or two lasting machines are provided for all of the lasting of the entire factory output of a given type of shoe. It is an object of the present invention to provide a universal wiper mechanism which will substantially reduce the number of wipers required for a given machine and increase the productive capacity of the machine by reducing the time spent in changing wipers. It is a further object of the invention to provide a wiper which by reason of its inherent ability to conform itself to the shape of the shoe will accurately fit any and all shoes on which it operates.

With the above objects in view, the present invention, in one aspect, consists in the provision of a lasting wiper mechanism comprising a wiper carrier constructed and arranged for advancing and retracting movements, and a resilient wiper so mounted on the carrier that the carrier exerts a direct thrust against the wiper advancing it bodily to perform an overwiping operation, said carrier and wiper being arranged for relative movement in the direction of the overwiping movement of the wiper during the overwiping operation. In accordance with a feature of the invention, the illustrated wiper is so constructed and arranged that upon contact of a portion thereof with the shoe in the course of the overwiping operation, the non-contacting portion of the wiper continues its advancement until the entire extent of the wiper is in contact with the shoe. In accordance with a further feature of the invention lasting engagement of the entire length of the resilient wiper with the shoe is insured by the provision of pressure means interposed between the wiper and the carrier. As herein illustrated, said pressure means comprises a plurality of springs suitably mounted between the carrier and the wiper and spaced at short intervals from each other along the length of the wiper. As herein illustrated, said springs are mounted on a plurality of pins slidably mounted in the wiper carrier and fixed to said resilient wiper. The illustrated resilient wiper is so shaped that in its overwiped position it supports an outwardly flanged portion of a shoe, for example the outward extension of the welt of a prewelt shoe, for the sole-attaching operation. The illustrated side wiper, in accordance with a further feature of the invention, has embedded therein, the heads of said sliding pins and also has embedded therein an element coiled about the heads of said pins and providing an anchorage therefor in the wiper.

In another aspect of the invention, the wiper carrier comprises a plurality of links connected end to end and adjustable in the direction of the height of a shoe arranged to be operated upon by the wiper in order to conform the wiper to the profile of the shoe bottom, that is, the shape of the shoe bottom as seen in side elevation. In accordance with a further feature of the invention, said links are pivotally connected to each other by the pins on which the wiper is supported. For conforming the carrier to the profile of the shoe bottom, novel means is provided for individually adjusting said links relatively to each other, said means, as herein illustrated, comprising adjusting screws constructed and arranged to operate in relatively spaced portions of adjoining links.

In another aspect thereof, the invention provides a lasting wiper mechanism comprising an end wiper, a resilient side wiper, a side wiper carrier mounted on said end wiper, and a plurality of sliding pins operatively connecting the side wiper to the carrier.

These and other features of the invention will now be described with reference to the accompanying drawings and pointed out in the appended claims.

In the drawings,

Fig. 1 is a plan view illustrating a pair of heel and side wiper assemblies in operating relation to a last;

Fig. 2 is an elevation illustrating one of said wiper assemblies in operating relation to a last; and Fig. 3 is a sectional elevation showing one of the wiper assemblies in operating relation to a prewelt upper mounted on a last, the wiper mechanism being shown in section on the line III—III of Fig. 1.

The illustrated wiper assembly is constructed and arranged to last the side portions and the adjacent heel end portion of a prewelt upper. The illustrated side wiper 10 is a relatively long narrow rubber member vulcanized to render it resilient and having a thin wiping margin as shown in Fig. 3 adapted to operate within the welt crease of a prewelt upper, for example, the upper 12 shown in lasted position on a last 14 having mounted on its bottom face an insole 16 and a filler 18. It will be understood that the wiper is flexible both widthwise and heightwise of the last and, therefore, is readily adjustable for operation on a considerable run of sizes. It will also be understood that such a wiper is operable interchangeably on right and left shoes and is operable on a wide range of styles. So far as the inherent characteristics of the wiper itself are concerned it would no doubt operate interchangeably on men's, women's and children's shoes but for convenience of illustration and description it is herein illustrated in a wiper assembly particularly adapted to operate on women's shoes. This assembly comprises a pair of heel wipers 20 which are extended outwardly to provide support for carrying means on which the illustrated side wiper 10 is mounted. Referring to the left wiper assembly illustrated in Fig. 1 the heel wiper 20 is provided with three tongues 22, 24 and 26 extending toewardly therefrom and spaced from each other to receive between them tongues 28 and 30 of the heel end link 32 in a series of links extending lengthwise of the shoe and providing the means for carrying the side wiper 10. Similar interengaging tongues provide the connections between the links themselves. For connecting the link 32 to the heel wiper 20 a pin or pintle rod 34 extends widthwise of the shoe through aligned bores in said tongues. It will be understood that similar pins are provided for hinging the links to each other. For mounting the side wiper on its carrying means each pin has a rounded head 36 which is surrounded by a coiled spring 38 extending lengthwise of the side wiper, both the spring and the headed end of the pin being embedded in the wiper. The spring 38 provides an anchorage in the wiper for the headed end of the pin and also reinforces the wiper. In the overwiping operation the wiper-carrying links act on the wiper through springs 40 surrounding the pins and spaced between the outer edge face of the wiper and the inner edge faces of the links. When the wiper assembly is retracted the side wiper is positioned relatively to said links by stop nuts 42 (Fig. 1) on threaded outer end portions of said pins which nuts engage the outer edge faces of said links. In the illustrated assembly the inner line of the side wiper carrying assembly has a convex curvature which is so shaped as to enable the side wiper to operate on a run of sizes of women's shoes and to operate interchangeably on right and left shoes with a minimum of movement of any portion of the side wiper relatively to the wiper carrying mechanism.

For adjusting the heightwise curvature of the side wiper to make it conform to the curvature of the shoe bottom, mechanism is provided for suitably adjusting the links of the wiper carrier. This mechanism comprises a plurality of knurled headed screws 44 (Fig. 2) for individually swinging the links on the hinge pins. Each of the screws 44 is mounted in a tapered hole in a block 46 (Fig. 1) set into a rectangular opening in the link and pivotally mounted on trunnion pins 48 (Fig. 3) arranged parallel to the hinge pins. At its lower end each of the screws 44 is provided with spaced flanges 50 which carry between them the forked ends of an angular extension 52 of the tongue 24 of the adjoining link in the direction of the heel end of the shoe. Each screw 44 is maintained in predetermined and constant angular relation to the extension 52 by the flanges 50, the angular relation of the screw to the link in which it is carried changing with each adjustment of the screw. (See Fig. 2.)

The dimension of the links widthwise of the shoe is substantially greater than their dimension lengthwise of the shoe to the end that there will be a minimum of angular play widthwise of the shoe between them, thus providing a substantial and relatively rigid side lasting assembly.

While the side wiper is herein illustrated as mounted on a carrier secured to a heel wiper plate and receiving its operating movements from the advancement of said heel wiper plate, it is to be understood that the invention is not limited in its scope to the illustrated wiper organization but, on the contrary, the side wiper carrier may, if desired, be mounted independently of the heel wiper. An example of an alternative construction in which the side wiper is mounted on a carrier which is not secured to an end wiper is disclosed in United States Letters Patent No. 2,180,277, granted November 14, 1939 on an application filed in the name of Rene E. Duplessis. In Fig. 6 of said patent the side wiper 26 is mounted on a carrier 36 mounted independently of the end wipers. It will be understood that the central link in the series of links which comprise the applicant's wiper carrier could be provided with a downwardly extending tongue to enable said link to be mounted on a support, such, for example, as the member 40 illustrated in Fig. 6 of the Duplessis patent. It will be understood that in such a construction the series of links would be adjusted from the fixed central link both heelwardly and toewardly rather than toewardly from their connection to the heel wiper plate as in the illustrated construction.

Having thus described my invention, what I claim as new and desire to secure by Letters Patent of the United States is:

1. A lasting wiper mechanism comprising a wiper carrier constructed and arranged for advancing and retracting movements, and a resilient wiper so mounted on the carrier that the carrier exerts a direct thrust against the wiper advancing it bodily to perform an overwiping operation, said carrier and wiper being arranged for relative movement in the direction of the over-wiping movement of the wiper during the overwiping operation.

2. A lasting wiper mechanism comprising a wiper carrier constructed and arranged for advancing and retracting movements, and a resilient wiper mounted on the carrier for movement relatively to the carrier widthwise of a shoe positioned to be operated upon by said mechanism, the wiper being so mounted on the carrier that the carrier exerts a direct thrust against the wiper advancing it bodily to perform an overwiping operation.

3. A lasting wiper mechanism comprising a wiper carrier constructed and arranged for advancing and retracting movements, a wiper mounted on the carrier and constructed and arranged for operation on the concave portions at opposite sides of the shank, said wiper being so constructed and arranged that upon contact of a portion thereof with the work in the course of the over-wiping operation the non-contacting portion of the wiper advances relatively to said contacting portion until the entire extent of the wiper is in contact with the work.

4. A lasting wiper mechanism comprising a wiper carrier, a resilient wiper mounted on the carrier for movement relatively to the carrier in the direction of the advancing movement of the carrier, the wiper being so mounted on the carrier that the carrier exerts a direct thrust against the wiper advancing it bodily to perform an overwiping operation, and pressure means interposed between the carrier and the wiper for urging the wiper against a shoe.

5. A lasting wiper mechanism comprising a wiper carrier constructed and arranged for advancing and retracting movements, a resilient wiper, a plurality of pins slidably mounted in said carrier for movement in the direction of the advancement of said wiper, said resilient wiper being mounted on the end portions of said pins, and resilient means interposed between the wiper and the carrier.

6. A lasting wiper mechanism comprising a wiper carrier constructed and arranged for advancing and retracting movements, a resilient wiper, a plurality of pins slidably mounted in said carrier for movement in the direction of the advancement of said wiper, said resilient wiper being mounted on the end portions of said pins, and a plurality of springs surrounding said pins respectively and interposed between said resilient wiper and its carrier.

7. A lasting wiper mechanism comprising a wiper carrier constructed and arranged for advancing and retracting movements and a wiper element mounted in said carrier and constructed and arranged to be conformed to the periphery of a shoe by its contact therewith, said wiper element being so shaped that in its overwiper position it supports a portion of the shoe which is outwardly flanged for the sole attaching operation.

8. A lasting wiper mechanism comprising a wiper carrier constructed and arranged for advancing and retracting movements, an end wiper constructed and arranged to move with said carrier and a side wiper mounted in said carrier and constructed and arranged to be conformed to the peripheral shape of a shoe by its contact therewith, said side wiper being so shaped that in its overwiped position it supports a portion of the shoe which is outwardly flanged for the sole attaching operation.

9. In a lasting wiper mechanism, a wiper characterized by an inherent resiliency such that it is conformed longitudinally thereof to the peripheral shape of a shoe by its contact therewith and further characterized by the provision thereon of a flat surface constructed and arranged to support an outwardly flanged portion of a shoe when the wiper is in its advanced position, and means embedded in said wiper providing an anchorage for a thrust member.

10. A lasting wiper mechanism comprising a wiper carrier constructed and arranged for advancing and retracting movements and a wiper mounted in said carrier, said wiper being characterized by an inherent resiliency such that it is conformed longitudinally thereof to the peripheral contour of a shoe by its contact therewith and further characterized by the provision on said wiper of a flat surface constructed and arranged to support the outwardly flanged portion of a shoe.

11. A lasting wiper mechanism comprising a resilient wiper, a plurality of pins embedded in said wiper and extending outwardly therefrom, and a wiper carrier in which said pins are mounted to slide in the direction of the lasting movement of said wiper.

12. A lasting wiper mechanism comprising a resilient wiper, a plurality of pins embedded in said wiper and extending outwardly therefrom, a wiper carrier in which said pins are mounted to slide in the direction of the lasting movement of said wiper, and a plurality of springs surrounding said pins respectively and interposed between the wiper and the carrier.

13. A lasting wiper mechanism comprising a resilient wiper, an assembly embedded in said wiper comprising a plurality of headed pins and an element providing an anchorage for the heads of said pins in said wiper, said pins being arranged to extend outwardly from said wiper, and a carrier in which the outwardly extending portions of said pins are mounted.

14. A lasting wiper mechanism comprising a resilient wiper, an assembly embedded in said wiper comprising a plurality of headed pins and an element extending longitudinally of and coextensive with said wiper, said element being coiled about the heads of said pins to provide an anchorage for said pins in said wiper, said pins being arranged to extend outwardly from said wiper, and a carrier in which the outwardly extending portions of said pins are mounted.

15. A lasting wiper mechanism comprising a resilient wiper, an assembly embedded in said wiper comprising a plurality of headed pins and an element coiled about the heads of said pins and providing an anchorage therefor in said wiper, said pins being arranged to extend outwardly from said wiper, and a carrier in which the outwardly extending portions of said pins are mounted to slide in the direction of the lasting movement of said wiper.

16. A lasting wiper mechanism comprising a resilient wiper, an assembly embedded in said wiper comprising a plurality of headed pins and an element coiled about the heads of said pins and providing an anchorage therefor in said wiper, said pins being arranged to extend outwardly from said wiper, a carrier in which the outwardly extending portions of said pins are mounted to slide in the direction of the lasting movement of said wiper, and means interposed between the wiper and its carrier for normally holding the wiper at the limit of its movement away from the carrier.

17. A lasting wiper mechanism comprising a wiper carrier, an end wiper constructed and arranged to move with said carrier, a resilient side wiper, a plurality of pins extending outwardly from said side wiper and slidably mounted in said carrier for movement in the direction of the lasting movement of said side wiper.

18. A lasting wiper mechanism comprising a lasting wiper made of resilient vulcanized rubber, a plurality of headed pins embedded in said wiper and extending outwardly therefrom for mounting in a wiper carrier.

19. A lasting wiper mechanism comprising a last wiper made of resilient vulcanized rubber, a plurality of headed pins embedded in said wiper and extending outwardly therefrom for mounting in a wiper carrier, and a continuous spring coiled about the heads of said pins and also embedded in said wiper.

20. A lasting wiper mechanism comprising a flexible side wiper and a wiper carrier comprising a plurality of links connected end to end and adjustable in the direction of the height of a shoe arranged to be operated upon by the wiper.

21. A lasting wiper mechanism comprising a side wiper which is flexible in the direction of the height of a shoe arranged to be operated upon thereby and a wiper carrier comprising a series of links pivotally connected end to end by pins arranged generally widthwise of the shoe.

22. A lasting wiper mechanism comprising a side wiper which is flexible in the direction of the height of a shoe arranged to be operated upon thereby and a wiper carrier comprising a series of links pivotally connected end to end for relative adjustment generally heightwise of the shoe, and means for individually adjusting said links relatively to each other.

23. A lasting wiper mechanism comprising a side wiper and a wiper carrier comprising a plurality of members adjustable relatively to each other in the direction of the height of a shoe arranged to be operated upon by said wiper, and means for individually adjusting said members relatively to each other.

24. A lasting wiper mechanism comprising a flexible side wiper and a carrier therefor which consists of a series of elements relatively adjustable in the direction of the height of a shoe arranged to be operated upon by the wiper, said carrier in any adjustive position thereof being substantially rigid heightwise of the shoe.

25. A lasting wiper mechanism comprising a series of links hinged together by pintle rods and a continuous wiper carried by said rods.

26. A lasting wiper mechanism comprising a series of links, pintle rods forming hinges connecting said links, said pintle rods being movable endwise relatively to said links, a continuous wiper carried by end portions of said rods, and a plurality of springs interposed between the links and the wiper.

27. A lasting wiper mechanism for use in the manufacture of prewelt shoes comprising an end wiper constructed and arranged to operate within the welt crease of a prewelt upper, a wiper carrier secured to said end wiper, and a resilient side wiper mounted on the carrier, said wiper and carrier being relatively movable in the direction of the overwiping movement of the wiper, said side wiper being constructed and arranged to operate within the welt crease of a prewelt upper at a portion of the welted margin adjacent to the portion operated upon by the end wiper.

ANDREW EPPLER, Jr.